United States Patent Office 2,758,039
Patented Aug. 7, 1956

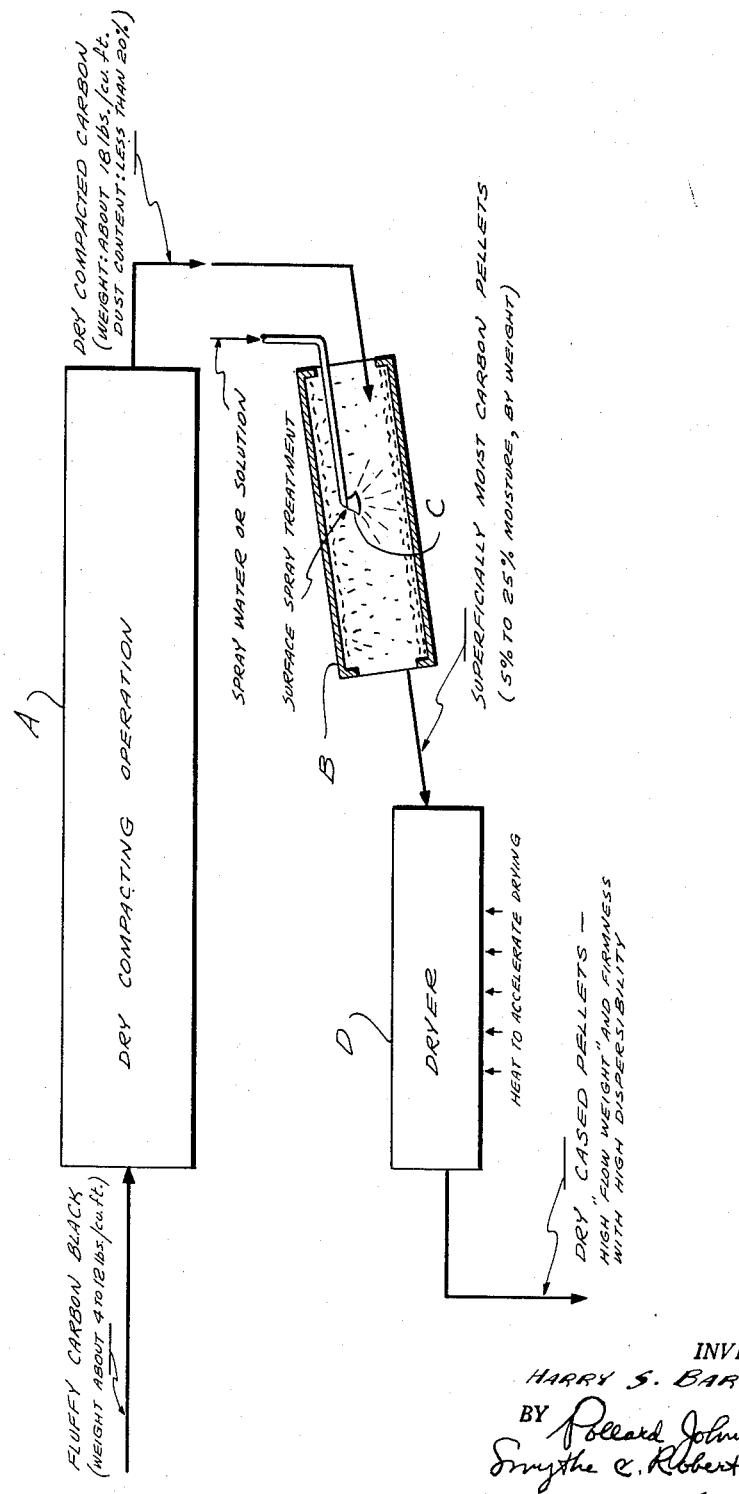

2,758,039

METHOD OF COMPACTING CARBON BLACK

Harry S. Barbour, Borger, Tex., assignor to J. M. Huber Corporation, Borger, Tex., a corporation of New Jersey Application March 17, 1954, Serial No. 416,816

5 Claims. (Cl. 117—100)

This invention relates to carbon black and particularly to a method for converting fluffy carbon into the form of relatively dustless and free flowing pellets.

Carbon black when originally collected from either channel or furnace plants is in the form of an extremely fine powder weighing about four pounds per cubic foot. The powder occludes a large amount of air and is extremely fluffy. It sometimes is agitated in order to remove some of the occluded air, until its weight is from 8 to 12 pounds per cubic foot, but fluffy carbon treated in that manner still is troublesome and expensive to package and transport, and it also creates a dust nuisance in handling.

This problem has been dealt with by converting carbon black into dense granules, usually designated as compacted carbon, which weigh from about 18 to 26 pounds per cubic foot. One method of producing compacted carbon is illustrated by U. S. Patents Nos. 2,065,371 and 2,131,686. In accordance with those patents, fluffy carbon is mixed with from 35 to 65% of its weight of water, or sufficient to produce a paste, and the pasty mixture is beaten with pins attached to a rotating shaft until the mass is formed into small granules. The granules are then dried in an externally heated rotated drum, and in the course of this process they become somewhat rounded and are formed into a relatively dustless and free-flowing granular mass.

A second known method, one which employs no water or other liquid, is described in U. S. Patent 2,164,164. In that method the fluffy carbon is introduced into one end of a slowly rotating drum in which it is rolled and tumbled until it has the form of small rounded pellets.

Since the introduction of free flowing compacted carbon to the trade, much of the carbon of commerce has been converted to a compacted form and transported in bulk in tank cars. The carbon pellets must be sufficiently strong to resist breakage and dust formation during the several handling steps involved from the time of their production until they are ready to be incorporated into end products such as rubber compounds, paints, inks, or the like. When their structural strength is insufficient, difficulty is encountered, for example, in the different weighing, conveying and other machines utilized for the handling of carbon black in the rubber industry. In general, it can be said that pellets produced by a wet method are more firm and dust free than pellets produced by the dry method. On the other hand, the wet process pellets are so firm that they resist disintegration in rubber, and they have rubber reinforcing properties inferior to those of carbon compacted by a dry method. The wet method is also more costly because it usually requires the evaporation of an amount of water almost equal to that of the carbon.

An object of this invention is to provide a new and improved method for the preparation of compacted carbon.

A further object is to provide a compacted carbon which is sufficiently firm to be transported satisfactorily but will still disintegrate and disperse satisfactorily in rubber.

When a single pellet of compacted carbon is dropped into water it absorbs water in the manner of a sponge and during the attendant swelling process it is broken into fragments.

I have now found that water may be added in the form of a fine spray to a moving mass of compacted carbon without breaking the pellets and with the result that only the surface layer of the pellets absorbs water. According to this invention, the objects mentioned above can be achieved by first compacting fluffy carbon by a dry process of the character described above, then spraying the surface of a moving mass of the compacted carbon pellets in a rotating drum with a limited amount of water sufficient to absorb water into only the surface layer of the pellets and to cause the dust to adhere to the surface of the pellets, and then drying the resulting product. In this manner I am able to produce pellets the inside of which has never been wetted and therefore is easily dispersible in rubber, while the surfaces of the pellets are sufficiently firm to produce strong pellets. A further advantage of this process is that the amount of water to be evaporated is only a fraction of that employed in the usual wet methods.

The carbon to be treated according to this invention should first be compacted by a dry method so that the pellets weigh at least about 18 pounds per cubic foot and the dust content is less than about 20% of the weight of the carbon. If the pellets are not sufficiently compacted to weigh about 18 pounds per cubic foot they are liable to disintegrate under the treatment. If the dust content is over 20% an excessive amount of water is required to collect it, and the mass is liable to become pasty. Good results are obtained when the dust is under 15% of the weight of the carbon, and the optimum practice is to dry compact the carbon black until the dust content is below 10%, before spraying the compacted black with water.

In carrying out the invention I prefer to introduce the fluffy carbon into the end of a rotating drum and to compact the carbon by tumbling it in the drum in the absence of liquid as described in U. S. Patent 2,164,164 to Howard W. Price, with or without the aid of rolling compression members. The dry compacted carbon so formed, containing the usual amount of dust, is then passed to a second rotating drum where it is sprayed with 5% to 25% of its weight of water while the carbon is maintained in motion. The amount of water is limited in such a manner that the granules of compacted carbon do not become sufficiently moistened to adhere to each other. This generally is found to be not over 25%, and in most cases considerably less than 25% is effective to produce an improved form of pellet. For example, a fine water spray equivalent to about 15% of the weight of the mass of compacted carbon usually gives excellent results.

The rolling motion of the superficially moistened compacted carbon pellets in the rotating drum causes them to pick up rapidly the residue of dusty carbon contained in the mass. The resulting moistened and relatively dust free mass of carbon pellets is then dried in any convenient manner. One convenient method of drying is to pass it through a slowly rotating externally heated dryer. When a long compacting drum is employed for the formation of the dry compacted carbon, the pellets may be sufficiently well formed before reaching the exit end of the rotating drum that the water spray can be applied to them near the exit end of the same drum, in which case the treated pellets discharged from the compacting drum are ready to be passed immediately to the dryer.

While water is the liquid preferred for use in the spraying step of this process, the water used may be of various kinds and may contain other substances to enhance or modify its effects. By the inclusion of soluble adhesive substances or binders in the spray liquid, these substances can be caused to accumulate on the surface of the pellets so as to give added strength to the shell of the pellets without affecting the carbon inside the pellets. For example, various sugars have been found to be beneficial, and I have employed advantageously inexpensive grades of sugar such as those found in cheap molasses. Other substances such as dilute cooked starch solutions or gum arabic may be used in the spray liquid.

The accompanying drawing presents a schematic flow chart to illustrate one of several possible ways of practicing this invention. In the drawing, A is an apparatus in which a dry compacting operation is carried on continuously, preferably a rotating drum; B is a rotating drum in which the dry compacted carbon continuously discharged from A is continuously tumbled and sprayed superficially with a fine mist of water or aqueous solution delivered at a limited rate through sprayer C; and D is a dryer, e. g., an externally heated rotating drum dryer, in which the water added at B is driven off or extracted from the superficially moist carbon pellets discharged from drum D so as to yield a product consisting almost entirely of dry cased carbon pellets which have distinctive combined properties of firmness and dispersibility.

Pellets of compacted carbon frequently are subjected to a compression flow test in order to measure their firmness or resistance to compression. In this test, a steel cylinder 2 inches in diameter and closed at one end is rested on the closed end and filled to a depth of 4 inches with the compacted carbon. A loose fitting piston is placed in the cylinder and the carbon is pressed by the application of weights to the piston. Successive lots of carbon are tested until a weight has been found which prevents the carbon from flowing when the piston is removed and the cylinder is inverted. The largest weight which can be applied to the carbon and leave it in a condition to flow completely from the cylinder is recorded as the flow weight. This weight is a relative measure of the ability of the carbon to resist crushing and packing.

The described compression flow test was used as a measure of firmness properties in the following examples which further illustrate the practice of my invention:

*Example I*

Channel carbon was compacted in a rotating drum by a method commonly employed in the carbon black industry. The resulting mass of dry compacted carbon weighed 24 pounds per cubic foot. Portions of this mass were treated with various amounts of water by spraying the water onto the surface of the carbon pellets while tumbling the pellets inside a rotating drum. The water was sprayed under pressure of about 10 to 15 pounds per square inch through a nozzle converting it into very finely atomized or mist like droplets. The resulting moistened pellets were then dried at about 300° F. in an externally heated rotating drum.

A further lot of the same carbon was compacted by a conventional wet method in which equal parts of carbon and water were employed.

The dust content and the flow weight of each sample of compacted carbon and properties obtained by using each sample in a rubber tread compound were determined similarly for all the samples, as follows:

| Original Compaction Method | Percent Water Added | Percent Dust Through 100 Mesh Screen | Flow Weight, Lbs. | Properties of Rubber compounds made with samples | |
|---|---|---|---|---|---|
| | | | | Load at 400% Elongation for 60 Min. Cure | Tensile at Break |
| Dry | 0 | 4.2 | 21 | 2,250 | 4,250 |
| Dry | 5 | 2.7 | 34 | 2,190 | 4,120 |
| Dry | 10 | 2.4 | 41 | 2,250 | 4,250 |
| Dry | 15 | 2.2 | 47 | 2,265 | 4,170 |
| Dry | 20 | 1.8 | 55 | 2,230 | 4,060 |
| Dry | 25 | 1.9 | 47 | 2,180 | 4,195 |
| Wet | 100 | 1.6 | 52 | 1,930 | 3,975 |

*Example II*

A furnace carbon black produced from natural gas was dry pelletized to weigh 22 pounds per cubic foot, and samples of the resulting pellets were treated with water and with a dilute solution of molasses in water, by spraying the liquid to the surface of the pellets in a rotating drum. The pellets were then oven dried in pans at 300° F. The dust content, flow weight and properties in a tire tread stock were then determined, as follows:

| Liquid used | Percent Liquid Added | Percent Dust Through 100 Mesh Screen | Flow Weight | Properties of Rubber Compounds | |
|---|---|---|---|---|---|
| | | | | Load at 400% Elongation for 60 Min. Cure | Tensile at Break |
| None | 0 | 9.6 | 7.5 | 1,970 | 2,880 |
| Water | 20 | 2.0 | 41.3 | 1,840 | 2,850 |
| 0.5% solution of black strap molasses | 20 | 0.4 | 60.0 | 1,930 | 2,890 |

*Example III*

A dry furnace black made from a liquid petroleum hydrocarbon at the rate of 10,000 pounds in 24 hours was compacted by passing it through a rotating drum 8 feet in diameter and 16 feet long. The pelletized carbon which weighed 19.5 pounds per cubic foot was discharged into a drum 2.5 feet in diameter and 4 feet long, which was arranged to discharge the treated carbon while maintaining in the drum a bed of carbon 7 inches deep. The smaller drum was revolved at 6 R. P. M. while the surface of the carbon tumbling in it was sprayed with a fine mist of water at the rate of one pint per minute. This rate amounted to 15% of water based on the weight of the carbon. The treated carbon, which appeared to be dry, was discharged into a dryer and thoroughly dried at 320° F. Before being sprayed with water the compacted black contained 9.2% of dust passing through a 100 mesh screen, and its flow weight was 14.7 pounds. After the water spraying treatment and drying, the dust content was 4.8% and the flow weight was 32.5 pounds.

While I have described particular ways of practicing the method of this invention, it will be evident that various other practices can be used without departing from the invention here disclosed and claimed. For example, the compacting, spraying and drying can be conducted in a single long drum, or the spray drum and dryer can be a single drum. Instead of dry compacting the fluffy carbon in a rotating drum, other known methods of dry compacting can be used. Further, the carbon can be dry compacted and then screened to remove the coarse particles and most of the dust before the spray treatment, in which case the principal benefit of the invention consists in the production of pelletized carbon having superior dispersion properties along with desired firmness and handling properties, there being little dust to be taken up on the pellets.

I claim:

1. The method of converting fluffy carbon black into an improved compacted form, which comprises compacting fluffy carbon black substantially in the absence of liquid until it is formed into dry compacted carbon weighing at least about 18 pounds per cubic foot and consisting of distinct pellets with less than 20% of dust, thereafter while maintaining the material in tumbling motion applying evenly to it a finely divided aqueous liquid in an amount equivalent to from 5 to 25% of the weight of the carbon, and thereafter drying the material to obtain a free flowing and relatively dustless but readily disintegratable compacted carbon.

2. The method of converting fluffy carbon black into an improved compacted form, which comprises compacting fluffy carbon black by tumbling it substantially in the absence of liquid until it is formed into dry compacted carbon weighing at least about 18 pounds per cubic foot and containing less than 20% of dust, thereafter while maintaining the material in motion applying evenly to it a finely divided aqueous liquid in an amount equivalent to from 5 to 25% of the weight of the carbon, and thereafter drying the material to obtain a free flowing and relatively dustless but readily disintegratable compacted carbon.

3. The method of converting fluffy carbon black into an improved compacted form, which comprises compacting fluffy carbon black by tumbling it continuously in the substantial absence of liquid until it is formed into dry compacted carbon weighing at least about 18 pounds per cubic foot and containing less than 20% of dust, thereafter while continuously tumbling the compacted carbon evenly applying to it a finely atomized spray of aqueous liquid in an amount equivalent to from 5 to 25% of the weight of the carbon, and thereafter drying the material while tumbling it to obtain a free flowing and relatively dustless but readily disintegratable compacted carbon.

4. A method as described in claim 3, said liquid being water.

5. A method as described in claim 3, said liquid being an aqueous solution of a substance adhesive to the carbon.

References Cited in the file of this patent

UNITED STATES PATENTS

| | | |
|---|---|---|
| 2,131,686 | Heller et al. | Sept. 27, 1938 |
| 2,306,698 | Heller | Dec. 29, 1942 |
| 2,502,106 | Skogg et al. | Mar. 28, 1950 |
| 2,550,802 | Gholson | May 1, 1951 |
| 2,591,024 | Sweitzer | Apr. 1, 1952 |